United States Patent [19]

Cioletti

[11] Patent Number: 4,926,745
[45] Date of Patent: May 22, 1990

[54] PULL ROD ASSEMBLY

[75] Inventor: Olisse C. Cioletti, Pittsburgh, Pa.

[73] Assignee: The United States of Amerca as represented by the United States Department of Energy, Washington, D.C.

[21] Appl. No.: 184,327

[22] Filed: Apr. 21, 1988

[51] Int. Cl.$^5$ .................................................. F16J 1/00
[52] U.S. Cl. ........................................ 92/256; 92/257; 92/255; 277/153; 277/188 R
[58] Field of Search ................. 92/253, 255, 257, 258, 92/259, 248, 192, 193, 59, 128, 256; 277/152, 153, 188 R; 403/326, 261

[56] References Cited

U.S. PATENT DOCUMENTS

| 1,650,573 | 11/1927 | Searles | 403/261 |
| 2,026,454 | 12/1935 | Benzing | 403/261 |
| 2,853,347 | 9/1958 | Cooper, Jr. | 92/128 |
| 2,998,288 | 8/1961 | Newhouse | 92/85 R |
| 3,457,842 | 7/1969 | Tennis | 92/257 |
| 3,730,058 | 5/1973 | Siegel et al. | 92/128 |
| 3,951,048 | 4/1976 | Bloom, Jr. | 92/258 |
| 4,004,499 | 1/1977 | Beck | 403/261 |
| 4,069,747 | 1/1978 | Forry et al. | 92/167 |
| 4,207,807 | 6/1980 | Takata et al. | 92/128 |
| 4,592,267 | 6/1986 | Renzi | 92/128 |
| 4,630,958 | 12/1986 | McCallister | 92/128 |
| 4,757,751 | 11/1988 | Munoz | 92/128 |
| 4,771,678 | 7/1988 | Walker | 92/128 |
| 4,798,128 | 1/1989 | Mita | 92/59 |

FOREIGN PATENT DOCUMENTS

| 1315525 | 12/1963 | France | 277/188 R |
| 0271202 | 8/1970 | U.S.S.R. | 92/257 |
| 0402701 | 2/1974 | U.S.S.R. | 92/255 |
| 0727929 | 4/1980 | U.S.S.R. | 92/255 |
| 0619078 | 3/1949 | United Kingdom | 403/261 |
| 936897 | 9/1963 | United Kingdom | 92/128 |

Primary Examiner—Carl D. Price
Assistant Examiner—Thomas Denion
Attorney, Agent, or Firm—William R. Moser; Judson R. Hightower; Richard E. Constant

[57] ABSTRACT

A pull rod assembly comprising a pull rod having three peripheral grooves, a piston device including an adaptor ring and a seal ring, said piston device being mounted on the pull rod by a split ring retainer situated in one groove and extending into an interior groove in the adaptor and a resilient split ring retained in another groove and positioned to engage the piston device and to retain the seal on its adaptor.

4 Claims, 1 Drawing Sheet

PULL ROD ASSEMBLY

BACKGROUND OF THE INVENTION

This invention relates to a piston means and rod assembly, and more specifically to an improvement in attaching said piston means to said rod.

There are numerous constructions known in the art for connecting a piston means to a rod. Prior art construction involves the machining of a pull rod from a solid bar whereby the bar size would be reduced in diameter except for the provision of a section of the rod having a larger diameter and functioning as part of the piston means. For example, the initial solid bar size could be 1¼ inches in outer diameter and would be machined to a 1 inch diameter over its entire length of approximately 18 inches with the exception of a portion of the length retained for forming part of the piston means.

Another known construction for connecting a piston and rod is shown in U.S. Pat. No. 3,951,048 to V. J. Bloom, Jr., et al. In that prior art patent, a piston and rod assembly are shown wherein the rod has a pair of axially spaced grooves and the piston includes recesses disposed in opposite faces. One of the recesses is radially larger than the other and locking members are disposed in the grooves of the rod and extend into each of the recesses. A further retaining means including a snap ring and an annular ring are disposed outwardly of the locking members in the larger recess for removably retaining the locking members in the recess. In addition, threaded screws may be used to interconnect the retaining ring and the piston. Still another prior art construction is shown by U.S. Pat. No. 2,998,288 to Newhouse in which a sealing element directly encircles a piston rod.

SUMMARY OF THE INVENTION

The practice first described above concerning the formation of a piston and rod by machining produces a one-piece construction. However, to do so requires precision machining of the shaft over a substantial length. The construction according to Bloom et al and Newhouse are relatively complicated in that they require numerous parts and fasteners. Accordingly, it is an object of the present invention to provide an improvement in mechanical design wherein the one-piece construction is modified to provide simplified machining and to use commercially available precision stock during manufacture. It is a further object of the present invention to provide an improved pull rod assembly which is easy to assemble and disassemble and is relatively less complex than the assemblies exemplified by Bloom et al and Newhouse.

According to one aspect of the present invention, I provide a piston and rod assembly having a rod, piston means disposed on the rod and locking means for locking the piston means on the rod. The locking means include first and second axially spaced grooves formed in the rod, a recess formed and extending into the piston means, a first locking member disposed in the first groove and extending radially outwardly therefrom into the recess of the piston means. A second locking member is disposed in the second groove on said rod and extends radially outwardly therefrom so as to engage the portion of the piston means disposed adjacent the second groove. The rod is characterized by being substantially the same diameter along its length with the exception of the recesses that are formed in the rod. The first locking member is in the form of a split ring retainer while the second locking member is a resilient metal split ring. The piston means according to the present invention includes a shouldered BAL SEAL adapter and a BAL SEAL. The BAL SEAL comprises a ring-shaped molded seal which has a V-shaped cross-section and a flexible element extending radially outward from the adaptor.

According to a further aspect of the present invention, the rod is provided with a third peripheral groove situated between the first and second grooves and a "O" ring is disposed in the third groove to extend radially outward therefrom into sealing engagement with the piston means.

It sould be understood that other objects and advantages of the present invention will be readily appreciated by reference to the following detailed description when considered in connection with the accompanying drawings.

DRAWINGS

DESCRIPTION OF THE PREFERRED EMBODIMENT

Figure 2:
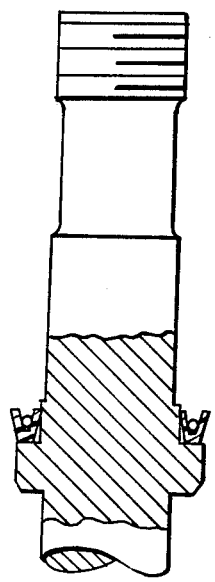
FIG. 2 is a cross sectional view of a pull rod assembly according to the prior art.
Figure 1:
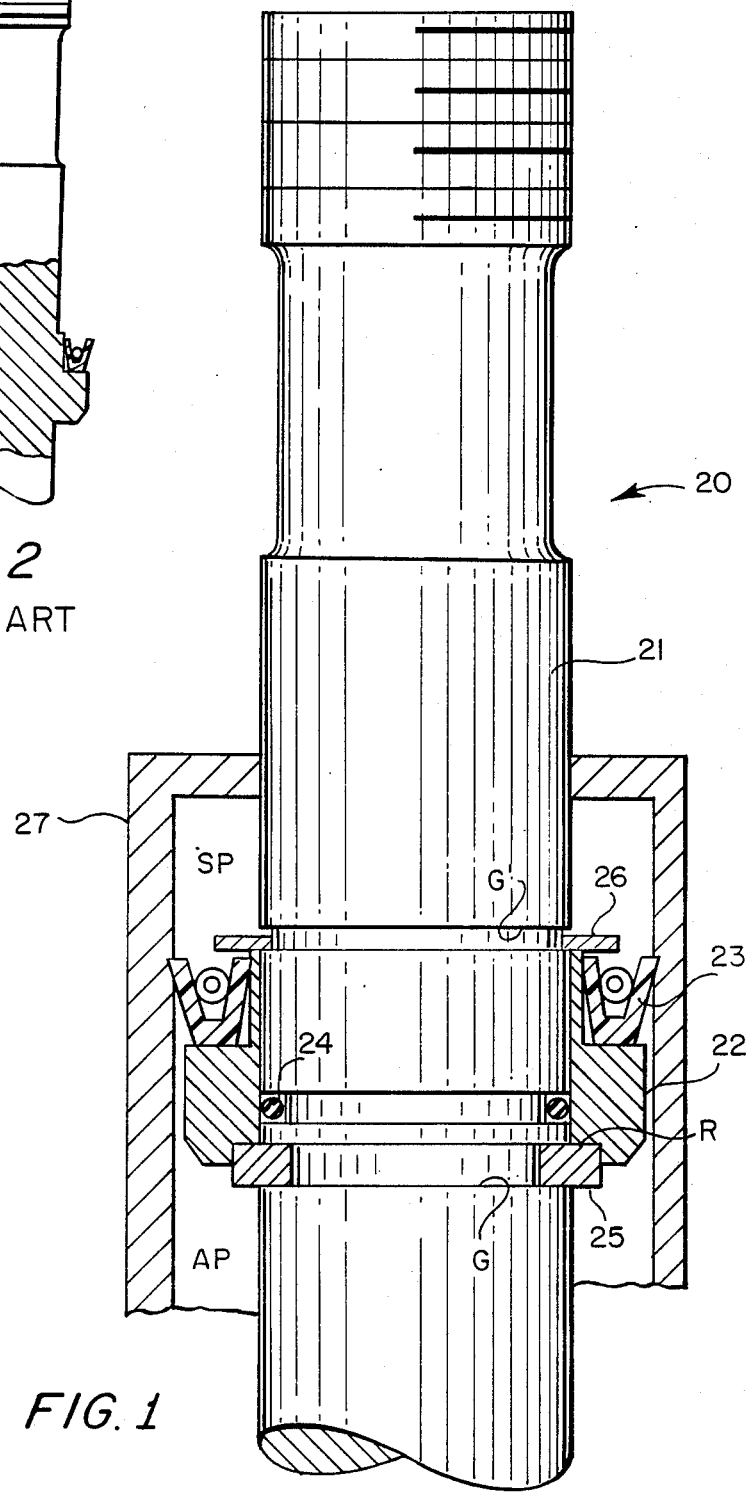
FIG. 1 is a fragmentary, partially broken away cross sectional view of a preferred embodiment of the present invention.

Referring to FIG. 1, a piston and rod assembly in accordance with one embodiment of the present invention is generally shown at 20. The piston and rod or pull rod assembly 20 includes a pull rod 21 and a piston means (PM) comprising a BAL SEAL adaptor 22 and a BAL SEAL 23. The assembly also includes a locking means for locking the piston means (PM) onto the pull rod 21. The means for locking the piston means to the pull rod 21 includes first and second axially spaced grooves G and G' in the rod 21. Also included is a recess R extending into the BAL SEAL adaptor 22. A split retainer ring 25 is disposed in the first groove G and extends radially therefrom into the recess R in the BAL SEAL adaptor 22. A second locking member in a form of the TRUE ARC ring 26 is disposed in the second groove G' and extends radially outward therefrom so as to be in engagement with a portion of the BAL SEAL adaptor 22 that is disposed adjacent to the second groove G'. The TRUE ARC ring 26 is of sufficient diameter that it also serves to hold the BAL SEAL 23 toward the shoulder in adapter 22 and this keeps the seal 23 from sliding off of the BAL SEAL adaptor 22 when the later is moved in a cylinder 27.

The pull rod 21 is preferably made from commercially available precision stock and requires only the machining of grooves and, in some cases, through holes. The BAL SEAL adaptor 22 provides an increased diameter to form part of the piston means. The adaptor 22 provides proper sizing for the BAL SEAL 23 itself, and is appropriately sized to be sealed to the pull rod 21 by way of the "O" ring seal 24. Furthermore, the BAL SEAL adaptor 22 serves as a capture device at one end for the split ring retainer 25. The split ring retainer 25 is suitably designed so as to accomodate a high shear force. The TRUE ARC ring 26 functions to position the components and retain the BAL SEAL 23 positioned on the shoulder of the BAL SEAL adaptor 22.

The present invention is usable as a piston-cylinder construction, either single or double acting. The cylinder size is not restrictive but may require further design modification to ensure proper alignment of the various bores. According to the present invention, the assembly shown in FIG. 1 is that part of a fatigue testing machine which is used to transmit cyclic loading to test specimens mounted inside a pressure vessel. The particular are shown in FIG. 1 is the piston-cylinder portion of the pull rod where system pressure is fed back to accomplish an equilibrium of forces on the pull rod. According to the assembly in FIG. 1, cylinder 27 surrounds the pull rod 21 and the piston means (PM) and system pressure is maintained at point SP inside of cylinder 27 while atmospheric pressure is maintained at point AP within the cylinder 27.

EXAMPLE

According to one embodiment of the present invention a pull rod assembly has been constructed having the following parameters.

A pull rod 21 made of but not limited to 304 stainless steel and having a diameter of 1.000 inches and length of 17.25 inches has been provided with an adaptor known as a BAL SEAL adaptor. This adaptor is made of 304 stainless steel material. The adaptor has a length of 0.562 inches with an OD of 1.414 inches and an ID of 1.005 inches. A split ring retainer of 304 stainless steel material and having a thickness of 0.125 inches, an ID of 0.880 inches and an OD of 1.120 inches was used.

A retainer ring known as TRUE ARC and being made of PH-15-7 Mo material was used and it had an ID of 0.925 inches and an OD of 1.41 inches. Finally, a seal between the pull rod 21 and the interior of BAL SEAL adaptor 22 was formed by a "O" ring of a BUNA N material and having a size number 2-020.

The above materials were assembled after the pull rod 21 had been machined to have three peripheral grooves, the first being 0.130 inches wide and 0.875 inches deep to accept the split retainer. The second groove, spaced 0.562 inches from the closest edge of the first groove, was 0.030 inches deep and 0.046 inches wide. This second groove was designed to retain the TRUE ARC ring. Finally, a third groove was machined in the pull rod 21 and it was 0.062 inches from the closest edge of the split retainer receiving groove. Further, the third groove was 0.093 inches wide and 0.052 inches deep to accept the "O" ring to form the inner seal between the rod 21 and the Bal seal adaptor 22.

While I have shown and described a preferred embodiment of the present invention, it should be understood that modifications may be made in the construction and arrangement of parts without departing from the spirit and scope of the invention.

I claim:

1. In a piston and rod assembly having a rod, a piston means disposed on said rod, and locking means for locking said piston means onto said rod, said locking means including first and second axially spaced grooves in said rod, a recess extending into said piston means, a first locking member disposed in said first groove and extending radially therefrom and into said recess, a second locking member disposed in said second groove and extending radially therefrom into engagement with that portion of said piston means disposed adjacent to said second groove, the improvement comprising:

said rod has substantially the same diameter along its length, said first locking member is a split ring retainer, said second locking member is a resilient metal split ring, and said piston means comprising a cylindrical adapter surrounding said rod and having first and second end portions respectively abutting said first and second locking members, wherein said recess is formed in said first end portion and said second end portion having an inwardly extending shoulder portion formed therein and said piston means further comprising a ring-shaped seal disposed on said shoulder and held thereon by engagement with said second locking member.

2. The invention of claim 1, wherein said ring-shaped seal has a V-shaped cross section.

3. The invention of claim 1, wherein said rod has a third groove located between said first and second grooves and an "O" ring is disposed in said third groove and extends radially outward therefrom into sealing engagement with said piston means to seal it to said rod.

4. In a piston and rod assembly having a rod, a piston means disposed on said rod, and locking means for locking said piston means onto said rod, said locking means including first and second axially spaced grooves in said rod, a recess extending into said piston means, a first locking member disposed in said first groove and extending radially therefrom and into said recess, a second locking member disposed in said second groove and extending radially therefrom into engagement with that portion of said piston means disposed adjacent to said second groove, the improvement comprising:

a piston means comprising a cylindrical adapter surrounding said rod and having first and second end portions respectively abutting said first and second locking members, wherein said recess is formed in said first end portion and said second end portion having an inwardly extending shoulder portion formed therein and said piston means further comprising a seal member disposed between said shoulder portion and said second locking member.

* * * * *